United States Patent [19]

LaFleur

[11] Patent Number: 4,963,191
[45] Date of Patent: Oct. 16, 1990

[54] CEMENTING COMPOSITIONS

[75] Inventor: Joseph R. LaFleur, Byron Center, Mich.

[73] Assignee: Solid Flue Chimney Systems, Inc., Byron Center, Mich.

[21] Appl. No.: 395,256

[22] Filed: Aug. 16, 1989

[51] Int. Cl.$^5$ .................. C04B 14/14; C04B 14/20; C04B 14/16; C04B 14/18
[52] U.S. Cl. .................. 106/698; 106/DIG. 1; 106/DIG. 2; 106/675; 106/725
[58] Field of Search .................. 106/97, 98, DIG. 1, 106/DIG. 2, 405

[56] References Cited

U.S. PATENT DOCUMENTS

| | | | |
|---|---|---|---|
| 2,585,366 | 4/1948 | Bollaert et al. | 106/98 |
| 4,210,487 | 7/1980 | Dodson et al. | 106/98 |
| 4,518,431 | 5/1985 | Duvier, Jr. | 106/98 |

*Primary Examiner*—William R. Dixon, Jr.
*Assistant Examiner*—Melissa Bonner
*Attorney, Agent, or Firm*—Price, Heneveld, Cooper, DeWitt & Litton

[57] ABSTRACT

There are disclosed high temperature refractory mixes especially adapted for relining and resizing chimney flues, comprising from 65 to 70 weight percent of portland cement, from 21 to 25 weight percent of volcanic glass, from 6 to 10 weight percent of microsilica, from 0.05 to 0.12 weight percent of at least one air entraining agent and from 0.5 to 1.0 weight percent of at least one plasticizer.

15 Claims, No Drawings

CEMENTING COMPOSITIONS

This invention relates to cementing compositions. More particularly, the invention relates to cementing compositions which are suitable for use in relining and resizing old and new chimney chases.

Cementing compositions are well known articles of commerce which are used in a variety of applications, including the construction and oil field industries. An expanding use of cementing compositions is in resizing new and relining dangerous chimneys. Dangerous chimneys include those with loose or cracked mortar joints or brick work, or were built before construction codes mandated the use of tile liners, and include those with creosote staining or buildup. A major factor contributing to the need for resizing new chimneys and relining old chimneys is the increased use of wood stoves and fireplace inserts, which provide cheaper heat but hotter gasses than are normally encountered in chimneys designed for fireplaces rather than heating. The gasses and heat produced by modern woodstoves and fireplace inserts are intense enough to crack tile liners, while unlined chimneys typically cannot safely endure heat above about 600° F. Whether new or old installations, chimneys designed for fireplaces are generally too large to accommodate solid fuel heaters and fireplace inserts, and pose a potential fire hazard due to excessive creosote buildup and poor ventilation, as well as reducing fuel efficiency.

While defective chimneys can be repaired by tearing down and rebuilding the existing structures, the repair of older chimneys and resizing of new chimneys is more efficiently accomplished at significant cost savings by installing a lining material comprising an insulating flue mix. One method for installing the lining material includes lowering a flexible tube or bag to which spacers have been attached at intervals to keep the bag centered within the chimney shaft or chase. The tube is then inflated to the proper flue diameter and a slurry comprising the insulating flue mix is pumped down the shaft from the chimney top. After the material hardens overnight, the tube is deflated and removed, leaving a smooth, leak-free lining bonded to the chimney. A further benefit is provided in that the relining has the effect of reducing the flue diameter from its original size which results in better drafts and more efficient burning. The state-of-the-art insulating flue mixes comprise a combination of portland cement and perlite which typically exhibit compressive strengths on the order of 600 to 700 psi after curing. Among other requisites, insulating flue mixes must pass Underwriter Laboratory standards for chimney liners. For example, UL Standard 103 requires that the liner be effective as an insulating medium at 2" clearance to combustibles (wood joists and the like must be at least 2" from the chimney exterior walls). A new standard, UL Standard 1777, and a proposed Canadian Standard, ULC S640M, have reduced the clearance to combustibles to 1", a much more stringent requirement. There is a need for improved refractory cement compositions for relining and resizing chimney flues.

SUMMARY OF THE INVENTION

In accordance with the present invention, there is provided a cementing composition comprising portland cement, volcanic glass, at least one air entraining agent, microsilica and plasticizers. The cementing compositions of the present invention are typically provided as a dry mix and are readily converted to an aqueous slurry by compounding the dry mix with an appropriate amount of water to afford a readily pumpable aqueous slurry. The compositions of the invention when cured exhibit greater strength, are lighter in weight, more impervious to water, that is, the cured invention exhibit 90% less water absorption than do the prior-used, state-of-the-art insulating refractory mixes and exhibit compressive strengths of at least 1800 psi, and typically greater than 2000 psi. In addition, the cured liners pass the Canadian ULC S640M and the United States UL 1777 and 127 code provisions.

DESCRIPTION OF THE PREFERRED EMBODIMENT

The present invention provides an insulating flue mix or refractory cement mix constituting a dry blend comprising from 65 to 70 percent by weight of at least one portland cement, from about 6 to 10, and preferably 7 to 9 weight percent of microsilica; from 21 to 25 percent by weight of at least one volcanic glass; from 0.05 to 0.12 percent by weight of at least one air entraining agent; and from 0.5 to 1 weight percent of at least one plasticizer.

The dry insulating flue cement mixes of the composition are readily converted to pumpable cement slurries by blending the dry ingredients with water. The amount of water employed is typically in the range between about 3.8 and 4.5 gallons of water per 60 pounds of dry mix, with 4 to 4.4 gallons of water being particularly preferred.

Cured concrete prepared from the refractory mixes of the invention exhibit compression strengths after 28 days in excess of 1800 psi and will typically provide compressive strengths after 28 days between 2000 and 2100 psi; with substantially reduced water absorption.

Substantially any of the commercially available types of portland cement can be employed in the compositions of the present invention, with the types I and II being currently preferred. Portland cements typically comprise from 60 to 67% lime, 19 to 25% silica, 3 to 8% alumina, and 0.3 to 6% iron oxide, together with 1 to 3% sulphur trioxide, 0.5 to 5% magnesia, 0.3 to 1.3% alkalies and 0.1 to 0.4% titanium oxide. These materials are well known, commercially available from a variety of sources, and need not be further discussed in detail.

The microsilica compounds which are employed in insulating flue mixes of the invention are well known commercially available materials. Compositionally, the microsilica is comprised mainly of amorphous silica, carbon and small amounts of the oxides and salts of aluminum, iron, magnesium, calcium, sodium and potassium. The microsilicas are water insoluble, particulate materials of essentially submicron size (less than 1 micrometer). The microsilicas are fly ash, amorphous silica, silica fume and condensed silica fume. Fly ash can be described as the fine ash produced by forced draft combustion of powdered coal, and it is to be distinguished from fume silica which is a colloidal form of silica made by combustion of silica and tetrachloride in hydrogen-oxygen furnaces. The amount of microsilica which is employed in the compositions of the invention is important. If the amount is above about 25%, there is an undesirable increase in the weight and an accompanying reduction in the insulative characteristics of the cured concrete. Below about 20%, there is an undesirable increase in the porosity of the cured concrete with an attendant undesirable increase in water permeability.

Substantially any of the glassy volcanic rocks which cooled so rapidly during their formation that they are wholly or in part made up of a glassy material in which the different elements did not have the opportunity to group themselves into definite minerals can be employed in the insulating flue cement mixes of this invention. The volcanic glasses include obsidian, pitchstone, perlite and pumice. The commercial form of volcanic glass known as expanded perlite is currently preferred, with pumice being a secondary choice.

The high temperature refractory mixes of the present invention also include at least one air entraining agent and at least one plasticizer. These materials have been employed in cementing compositions to enhance the workability of freshly mixed concrete slurries. Workability of concrete mixes is the property of a freshly mixed concrete that permits it to be placed in the form prior to taking an initial set. Any of the conventionally employed plasticizers which have been employed in concrete mixes including derivatives of lignosulphonic or hydroxylated carboxcylic acids, can be employed in the practice of the invention. The currently preferred plasticizer is sodium naphthalene sulfonate. Correspondingly, substantially any of the known air entrainment agents which have been employed to entrain air into the concrete mix in small quantities can be employed in the compositions of this invention. Air entraining compounds may be of various chemical compositions, with a common type being a soluble salt derived from sulfonated hydrocarbons. Currently, sodium lauryl sulfate is the preferred air entraining agent.

The dry refractory cement composition of the present invention are easily converted to a concrete slurry in conventional manner, such as by blending the dry cement mix into the requisite amount of water under vigorous conditions of agitation in order to insure a homogenous blending. Preferably, the amount of water which is employed in forming the concrete mixes is in the range from 3.8 to 4.5 gallons of water per 60 pounds of dry mix, with the water preferably being in the range from about 4 to 4.4 gallons per 60 pounds of dry mix.

The repair and resizing of chimneys with the refractory cements of this invention typically begin with a thorough cleaning of the chimney flue or chase. Subsequent to cleaning the chimney, the actual repair itself includes the placing of a form at the bottom of the chimney flue with the form being supported by jack supports. Additionally, the form has a centrally located opening providing communication between the flue and the fire box. A flexible tube to which spacers have been attached at intervals to keep the tube centered within the shaft is then lowered down the shaft with the lower end, which is sealed off, protruding below the form and into the fireplace. The flexible tube is then inflated to the proper flue diameter and the liquid concrete slurry is pumped down from the chimney top. After the material hardens overnight, the tube is deflated and removed, leaving a smooth, leak-free lining bonded to the chimney. The relining has the effect of reducing the flue diameter which, when combined with the insulating feature, results in better drafts and more efficient burning.

EXAMPLES

A refractory cementing slurry is prepared by blending a dry refractory cement mix having the following composition:

| Ingredients | Parts By Weight |
| --- | --- |
| portland cement, type I | 67.89 |
| microsilica | 8.08 |
| perlite | 23.31 |
| sodium lauryl sulfate | 0.09 |
| sodium naphthalene sulfonate | 0.63 | with water in a ratio of 4.2 gallons of water per 60 pounds of dry cement mix. Chimneys relined with the refractory mix were successfully tested for 0-inches clearance to combustibles (joints abut the exterior chimney wall) to the UL Standard For Chimney Liners, UL 1777, First Edition, dated Mar. 18, 1988 and ULC (Underwriter Laboratories of Canada) Draft Proposed First Edition, Standard For Liners For Masonry Chimneys, ULC S640M, dated Sept. 18, 1987.

Chimneys lined with the refractory cement mix also were successfully tested to Underwriter Laboratories UL standard 127 for Factory Built Fireplaces with 0 clearance to combustibles. In this test, the fire box sides were lined with fire brick, 2 inches of cured refractory mix of the invention and 8-inch concrete blocks; the fire box hearth was fire brick, 3 inches of the invention refractory mix over 24 gauge sheet metal, ¼-inch thickness of ceramic fiber insulation and 3-inch concrete; and a hearth extension was ⅜-inch thick ceramic tile, 1-inch refractory mix of the invention, 24 gauge sheet metal, ¼-inch ceramic fiber insulation over ¾-inch plywood.

In addition, the refractory mix exhibited a compressive strength in excess of 2100 psi after 28 days and substantially reduced water absorption.

In contrast, a non-invention refractory mix (representative of state-of-the-art refractory cements for chimney liners) comprising an aqueous slurry of portland cement, expanded perlite and air entraining additive passes the UL Standard to 3 at 2" clearance to combustibles. The cured liner has a compressive strength in the range of 600–700 psi after 28 days and a significantly greater water absorption than is exhibited by the invention compositions.

Although the invention has been described with reference to particular embodiments and examples it will be recognized that variations and modifications can be substituted therefor without departing from the principles and true spirit of the invention.

The embodiments of the present invention in which an exclusive property or privilege is claimed are defined as follows:

1. A dry high temperature refractory mix consisting essentially of from 65 to 70 weight percent of portland cement, from 21 to 25 weight percent of volcanic glass, from 6 to 10 weight percent of microsilica, from 0.05 to 0.12 weight percent of least one air entraining agent and from 0.5 to 1.0 weight percent of at least one plasticizer compound.

2. A refractory mix according to claim 1 wherein the amount of microsilica is in the range from 7 to 9 weight percent.

3. A refractory mix according to claim 1 wherein said volcanic glass comprises expanded perlite.

4. A refractory mix according to claim 3 wherein said air entraining agent is sodium lauryl sulfate and said plasticizer comprises sodium naphthalene sulfonate.

5. A refractory mix according to claim 4 consisting essentially of 67.89 weight percent portland cement, 23.31 weight percent expanded perlite, 8.08 weight percent microsilica, 0.09 weight percent sodium lauryl sulfate and 0.63 weight percent sodium naphthalene sulfonate.

6. A refractory slurry consisting essentially of a homogeneous blend of the refractory mix of claim 1 and from 3.8 to 4.5 gallons of water per 60 dry pounds of said refractory cement mix.

7. A refractory slurry according to claim 6 wherein said volcanic glass comprises expanded perlite.

8. A refractory slurry according to claim 7 wherein said entraining agent comprises sodium lauryl sulfate and said plasticizer comprises sodium naphthalene sulfonate.

9. A refractory slurry according to claim 6 wherein the amount of water is 4.2 gallons per 60 dry pounds of refractory mix consisting essentially of, on a dry basis, 67.89 weight percent portland cement, 23.31 weight percent expanded perlite, 8.08 weight percent microsilica, 0.09 weight percent sodium lauryl sulfate and 0.63 weight percent sodium naphthalene sulfonate.

10. A solid chimney liner material comprising a refractory concrete obtained by curing an aqueous refractory concrete slurry comprising water blended with a refractory mix consisting essentially of, on a dry basis, 65 to 70 percent by weight of portland cement, from 21 to 25 percent by weight of volcanic glass, from 6 to 10 percent by weight of microsilica, from 0.05 to 0.12 percent by weight of at least one air entraining agent and from 0.5 to 1 percent by weight of at least one plasticizer compound, wherein the amount of water is in the range from 3.8 to 4.5 gallons per 60 pounds of dry refractory mix.

11. A chimney liner material according to claim 10 wherein said volcanic glass comprises expanded perlite.

12. A chimney liner material according to claim 11 wherein said air entraining agent comprises sodium lauryl sulfate and said plasticizer compound comprises sodium naphthalene sulfonate.

13. A chimney liner material according to claim 10 wherein said liner material has a compressive strength after 28 days of at least 1800 psi.

14. A chimney liner material according to claim 10 wherein said refractory mix consists essentially of 67.89 weight percent portland cement, 23.31 weight percent expanded perlite, 8.08 weight percent microsilica, 0.09 weight percent sodium lauryl sulfate and 0.63 weight percent sodium naphthalene sulfonate and the amount of water is 4.2 gallons per 60 pounds of dry cement mix.

15. A chimney liner material in accordance with claim 14 wherein said liner material has a compression strength after 28 days of at least 2000 psi.

* * * * *